United States Patent [19]
Kuypers

[11] Patent Number: 4,748,040
[45] Date of Patent: May 31, 1988

[54] PROCESS FOR THE MANUFACTURE OF A FROTHY DRINK COMPOSITION

[75] Inventor: Theo W. Kuypers, Richigen, Switzerland

[73] Assignee: Nestec S.A., Vevey, Switzerland

[21] Appl. No.: 899,252

[22] Filed: Aug. 21, 1986

Related U.S. Application Data

[62] Division of Ser. No. 700,198, Feb. 11, 1985, abandoned.

[30] Foreign Application Priority Data

Feb. 20, 1984 [CH] Switzerland ............................ 806/84

[51] Int. Cl.$^4$ ..................... A23C 1/04; A23G 1/00; A23L 2/40; A23F 5/40
[52] U.S. Cl. .................................... 426/569; 426/570; 426/580; 426/583; 426/584; 426/585; 426/590; 426/594; 426/613; 426/470; 426/593
[58] Field of Search ............... 426/613, 580, 583, 585, 426/590, 570, 594, 584, 569, 470, 593

[56] References Cited

U.S. PATENT DOCUMENTS

| 3,121,639 | 2/1964 | Bauer et al. | 426/585 |
| 4,046,926 | 9/1977 | Gardiner | 426/585 X |
| 4,092,438 | 5/1978 | Tonner | 426/613 X |
| 4,337,278 | 6/1982 | Brog | 426/585 X |
| 4,397,927 | 8/1983 | Brog | 426/585 X |
| 4,438,147 | 3/1984 | Hedrick | 426/585 X |
| 4,446,164 | 5/1984 | Brog | 426/585 X |

FOREIGN PATENT DOCUMENTS 0010146 4/1978 Japan ..................................... 426/585

Primary Examiner—Joseph Golian
Attorney, Agent, or Firm—Vogt & O'Donnell

[57] ABSTRACT

A process for preparing a powder-form composition for preparation of a frothy beverage is prepared from an aqueous solution and suspension of fats, proteins, lactose and other carbohydrates, wherein the ratio by weight of proteins to lactose is from 1:3.5 to 1:5. The aqueous solution and suspension is preheated, heated, concentrated, gasified, pressurized and then this concentrate is directed through a spray nozzle and the spray is contacted with a plurality of turbulent component streams of drying air to decrease the pressure at the spray nozzle. The composition is then post-dried.

11 Claims, No Drawings

PROCESS FOR THE MANUFACTURE OF A FROTHY DRINK COMPOSITION

CROSS REFERENCE TO RELATED APPLICATIONS

This is a division of application Ser. No. 700,198, filed Feb. 11, 1985, now abandoned in favor of co-pending application Ser. No. 918,660, filed Oct. 15, 1986.

BACKGROUND OF THE INVENTION

This invention relates to a composition for a beverage, more particularly in powder form. The composition according to the invention is intended to be mixed with a liquid to prepare a beverage which may be frothy at its surface, for example, with hot water and soluble coffee or with hot liquid coffee to obtain a kind of "cappuccino", or with a cocoa-flavoured beverage.

There are several powder-form products for whitening coffee, from powdered milk to products containing few, if any, fats and/or lactic proteins.

U.S. Pat. No. 4,438,147 in particular describes a process for making a powder-form composition comprising a non-lactic fat, a non-lactic carbohydrate and a foam stabilizer containing proteins, such as sodium caseinate.

The manufacture of products of this kind necessitates particular precautions to ensure thorough mixing with a liquid. They have a show good wettability, high solubility and high stability to heat so that they do not flocculate, particularly in the presence of hot coffee which is slightly acidic.

SUMMARY OF THE INVENTION

The present invention is based on the surprising observation that these requirements are satisfied particularly well when a powder-form composition of which the principal constituents are 0.2 to 28% of fats, 5 to 16% of proteins, 16 to 62% of lactose and, optionally, up to 60% of other carbohydrates has a ratio by weight of proteins to lactose of from 1:3.5 to 1:5.

By way of comparison, this ratio is of the order of 1:1.4 for cow's milk.

Experience has shown that, from the point of view of heat stability, there is no advantage in deviating too far from 1:4 for the protein:lactose ratio of lactic compositions whereas compositions containing some non-lactic ingredients are less sensitive to heat.

If necessary, the particles of the composition may have small cavities of which the gaseous contents are intended to be released during mixing with a liquid, producing a froth.

DESCRIPTION OF PREFERRED EMBODIMENT

Providing the characteristic protein:lactose ratio of from 1:3.5 to 1:5 is obtained in the powder-form product, the process for making the composition according to the invention is no different in principle from the process used for making powdered milk, repeatedly described in the literature, or a coffee whitener of the type described in U.S. Pat. No. 4,438,147. To a solution of proteins (milk, caseinate) was added a stabilizing salt and, as required, lactose, sweet whey (from the coagulation of casein with rennet), lactic and/or vegetable fats, a carbohydrate such as sucrose, starch syrup, and if necessary, flavourings.

In aqueous solution, the stabilizing salt forms a buffer which neutralizes the mild acidity of the coffee during dissolution of the product in an aqueous medium, which contributes towards preventing flocculation of the proteins. The stabilizing salt may be, for example, a citrate or a phosphate, preferably sodium hydrogen phosphate ($Na_2HPO_4$), which is added in aqueous solution, for example in a quantity of from 0.6 to 1% by weight, based on dry matter, in the case of a citrate or preferably in a quantity of from 0.3 to 0.5% by weight, based on dry matter, in the case of sodium hydrogen phosphate.

The aqueous composition thus obtained, which has a solids content of from 16 to 20% by weight, is preheated and then heated in a plate heat exchanger or by injection of steam with a dwell period and concentrated by evaporation to a solids content of from 46 to 60%. This concentration step may be followed by another heating step with a dwell period.

Finally, the concentrate is dried by spraying in a tower and post-dried in a fluidized bed, for example.

In cases where it is desired to obtain a composition intended for the preparation of a frothy beverage, a preferably inert gas, such as nitrogen, is injected into the concentrate before it is spray-dried which produces small cavities in the particles.

The gas is preferably injected into the concentrate under a low pressure, for example, of 3-4 bars, immediately ahead of a mixing pump and the concentrate/gas mixture is taken up by a high-pressure pump situated near the mixing pump which delivers the gasified concentrate, preferably under a pressure of from 40 to 80 bars, to the nozzle of the spray-drying tower.

To avoid premature bursting of the small cavities produced in the particles during the initial phase of the drying process, it is important to ensure that the stream of hot air in the drying tower is not too vigorous. The hot air stream is preferably broken up in the manner of a jet deflector by a suitable device, for example, a screen or grille fixed to the end of the air feed pipe at the head of the drying tower so that the air pressure decreases by about half at the spray nozzle for the concentrate, the vigorous primary air stream thus being converted into a plurality of small turbulent secondary air streams.

Because of the risk of coagulation, it is difficult to dry all the lactic proteins and the liquid coffee by spraying. To obtain a mixture thereof in powder form, the acid in the liquid coffee has to be neutralized before mixing with the milk and drying or alternatively the milk and the coffee both have to be mixed in powder form. The same precautions have to be taken with the composition according to the invention as with the milk. If it is desired to make a mixed composition with soluble coffee or soluble coffee substitute on an industrial scale, instant coffee in powder or agglomerate form is preferably used for mixing with the powder-form composition according to the invention by introduction into the spray-drying tower. In one preferred process, the instant coffee or soluble coffee substitute is introduced through the pipe which returns to the tower the fine particles recovered by cyclones, for example. The proportion by weight of instant coffee or soluble coffee substitute is preferably 18 to 30% of the total. In cases where the components are mixed in powder form, it may be of advantage to colour the composition according to the invention with coffee, for example, to give the powder-form mixture a more uniform colour.

The powder-form composition according to the invention preferably has a density of the order of 300 g per liter so that three spoons of 3 g each are suitable for preparing a 140 ml cup of beverage. One spoon of instant coffee may then be added to obtain a cup of light coffee of the type known as white coffee. If the powder-form composition has small cavities, the addition of instant coffee and, if required, a small quantity of cocoa will give a beverage of the "cappuccino" type covered by an 8 to 15 mm thick layer of froth which retains the heat and produces a creamy sensation in the mouth.

The following Examples, in which the percentages are by weight, describe some suitable processes and possible compositions.

EXAMPLES

EXAMPLE 1

(Lactic composition)

To obtain 100 kg of end product, 460 kg of standardised milk containing 17.3 kg of lactic fat and 40.28 kg of non-fat solids are used. 0.4 kg of $Na_2HPO_4$ in the form of a 10% aqueous solution is mixed therewith, followed by the addition of 39.7 kg of lactose dissolved in 150 kg of lukewarm water. The whole is preheated to 80° C. in a plate heat exchanger and then heated to 115° C. by injection of steam for 5 seconds and concentrated by evaporation to a solids content of 51%. After a dwell time of about 10 minutes at 43° C., the concentrate is reheated to 75° C. by injection of steam and left for about 5 minutes. The throughput of the 50% solids concentrate is 670 liters/hour. 4 liters/minute of nitrogen under a pressure of about 3 bar are then injected into the concentrate which is then pumped under a pressure of 68 bar to the nozzle of a spray-drying tower where it is dried by spraying with air at 330° C. under a pressure of 15.7 kPa (1600 mm of water) on entry, the primary air stream being broken up into small secondary turbulent streams under a pressure of about 7.9 kPa (800 mm of water) by a screen at the spraying nozzle for the concentrate.

112 kg/h of agglomerated soluble coffee are introduced through the pipe which returns the fine particles recovered by cyclones to the tower, after which the product issuing from the tower is dried in a fluidized-bed.

The analysis of the powder-form composition according to the invention, excluding the soluble coffee, is as follows:

|  | % by weight |
| --- | --- |
| Lactic fat | 17.3 |
| Proteins | 15.3 |
| Lactose | 61.2 |
| Minerals | 3.7 |
| Moisture | 2.5 |

The proteins:lactose ratio is 1:4.

EXAMPLE 2

(Composition based on skimmed milk)

To obtain 100 kg of end product, 451.5 kg of skimmed milk containing 0.4 kg of lactic fat and 40.2 kg of non-fat solids are used. 0.4 kg of $Na_2HPO_4$ in the form of a 10% aqueous solution and then 39.7 kg of lactose dissolved in 150 kg of lukewarm water are mixed with the skimmed milk. The mixture is then preheated to 80° C. and 16.9 kg of coconut fat are continuously injected therein. The remaining procedure is as in Example 1 (heating to 115° C. by injection of steam for 5 seconds, concentration, etc.). The analytical composition is the same as in Example 1 except that the coconut fat replaces the lactic fat as to 16.9% of the mixture.

EXAMPLE 3

(Non-lactic composition)

To obtain 100 kg of end product, 0.4 kg of $Na_2HPO_4$ in the form of a 10% aqueous solution and then 12.8 kg of powder-form sodium caseinate, 47.1 kg of powder-form lactose and 10.0 kg of sucrose are added to 50 kg of water at 50° C. The mixture is then introduced into a colloid mill in which another 30 kg of water at 60° C. are added. After preheating to 70° C., 27.5 kg of coconut fat are continuously injected, after which the mixture is heated to 115° C. by injection of steam for 5 seconds, flashed and then homogenized in two stages (200 and then 50 bar). After cooling to 30° C. with a dwell period, the mixture is reheated to 75° C. by injection of steam. After another dwell period of 5 minutes, the remaining procedure is as in Example 1 (injection of nitrogen, spray-drying, etc.).

The analytical composition of the product, excluding the coffee, is as follows:

|  | % by weight |
| --- | --- |
| Fats | 27.6 |
| Proteins | 11.6 |
| Lactose | 46.9 |
| Sucrose | 10.0 |
| Minerals | 0.9 |
| Moisture | 3.0 |

The proteins:lactose ratio is 1:4.

EXAMPLE 4

(Flavoured lactic composition)

The procedure is as in Example 1, except that a small quantity of cinnamon powder and vanilla-flavoured sugar are added.

This addition may be made in three ways:
1. to the concentrate before drying
2. with the soluble coffee through the tube for returning the fines
3. to the fluidized bed following the tower

EXAMPLE 5

(Lactic composition with whey powder)

For 100 kg of end product, 283 kg of standardized milk containing 17.3 kg of fats and 23.8 kg of non-fat solids are used. 0.4 kg of $Na_2HPO_4$ in the form of a 10% aqueous solution are added to the milk. 23.8 kg of powdered sweet whey (pH at least 6.2), 15.3 kg of lactose and 17.0 kg of sucrose are dissolved in 120 kg of hot water at 60° C. When the mixture is free from clumps, it is added to the standardized milk. The remaining procedure is as described in Example 1. The analytical composition of the product less the coffee is as follows:

|  | % by weight |
| --- | --- |
| Fats | 17.5 |
| Proteins | 11.9 |
| Lactose | 46.8 |
| Sucrose | 17.0 |
| Minerals | 4.3 |

|  | % by weight |
| --- | --- |
| Moisture | 2.5 |

The proteins:lactose ratio is 1:3.9.

EXAMPLE 6

(Composition with vegetable fat and whey powder)

To obtain 100 kg of end product, 264 kg of skimmed milk containing 0.2 kg of fats and 23.8 kg of non-fat solids are used. 0.4 kg of $Na_2HPO_4$ in the form of a 10% aqueous solution is added to the skimmed milk. 23.8 kg of sweet whey powder (pH at least 6.2), 15.3 kg of lactose and 17.0 kg of sucrose are dissolved in 120 kg of hot water at 60° C. and, when the mixture is free from clumps, it is added to the standardized milk. 17.3 kg of coconut fat preheated to 60° C. are then continuously injected in the mixture immediately before preheating the whole to 80° C. The remaining procedure is as in Example 1. The analytical composition of the product less the coffee is as follows:

|  | % by weight |
| --- | --- |
| Fats | 17.5 |
| Proteins | 11.9 |
| Lactose | 46.8 |
| Sucrose | 17.0 |
| Minerals | 4.3 |
| Moisture | 2.5 |

The proteins:lactose ratio is 1:3.9.

What is claimed is:

1. A process for preparing a powder-form composition for a beverage which is frothy at its surface comprising:
   combining lactic proteins, lactose, fats, carbohydrates other than lactose and stabilizing salt constituents in an aqueous solution and suspension, such that the ratio by weight of lactic proteins to lactose constituents is from 1:3.5 to 1:5;
   preheating and then heating the aqueous solution and suspension;
   evaporating the heated aqueous solution and suspension of constituents to form a concentrate having a solids content of from 46% to 60% by weight;
   injecting an inert gas into the concentrate, mixing the gas and concentrate, and then increasing the pressure of the gasified concentrate to a pressure of from 40 to 80 bars and delivering the pressurized gasified concentrate to a spray nozzle in a drying tower for spraying via the nozzle;
   spray-drying the pressurized gasified concentrate spray from the nozzle by deflecting the stream of drying air into a plurality of turbulent component streams to decrease the air pressure of the drying air at the spray nozzle; and
   post-drying the spray-dried concentrate.

2. A process according to claim 1 wherein the gas is injected under a pressure of 3 to 4 bars.

3. A process according to claim 1 wherein the constituents comprise by weight 5 to 16% lactic proteins, 16 to 62% lactose, 0.2 to 28% fats, up to 60% carbohydrates, other than lactose, and a stabilizing salt selected from the group consisting of a citrate in an amount of 0.6 to 1% by weight based on the amount of dry matter of the constituents and a phosphate in an amount of 0.3 to 0.5% by weight based upon the amount of dry matter of the constituents.

4. A process according to claim 1 further comprising heating the concentrate and subjecting it to a dwell time after the concentration step.

5. A process according to claim 1 wherein the preheating and heating steps are performed by injection of steam with a dwell period.

6. A process according to claim 1 further comprising mixing a powder-form beverage material, selected from the group consisting of soluble coffee and soluble coffee substitute, with the spray-dried concentrate in the spray-drying step.

7. A process according to claim 6 further comprising recovering fine particles of the spray-dried concentrate and preparing a mixture of the particles and the powder-form beverage material and then mixing the mixture with the spray-dried concentrate in the spray-drying step.

8. A process according to claim 1 further comprising neutralizing acid in liquid coffee and preparing a mixture of the neutralized coffee with the concentrate prior to spraying and then the mixture.

9. A process according to claim 1 wherein a high pressure pump increases the pressure of the gasified concentrate and delivers it to the nozzle.

10. A process according to claim 1 wherein the air pressure at the spray nozzle is decreased by about half by the plurality of turbulent streams.

11. A process according to claim 1 wherein the plurality of turbulent streams are formed by a device selected from the group consisting of a screen and a grill fixed to the drying air feed.

* * * * *

UNITED STATES PATENT AND TRADEMARK OFFICE
CERTIFICATE OF CORRECTION

PATENT NO. : 4,748,040
DATED : May 31, 1988
INVENTOR(S) : Theo W. KUYPERS

It is certified that error appears in the above-identified patent and that said Letters Patent is hereby corrected as shown below:

On the title page, in the first line of the ABSTRACT, delete "process for preparing".

Column 1, line 28, "a" should be --to--.

Column 1, line 53, "EMBODIMENT" should be --EMBODIMENTS--.

Column 1, line 61, "was" should be --are--.

Column 5, line 34, "What is claimed is:" should be --I claim:--.

Column 5, lines 39 and 42, "constituents" should be deleted.

Signed and Sealed this

Thirty-first Day of January, 1989

Attest:

DONALD J. QUIGG

Attesting Officer

Commissioner of Patents and Trademarks